United States Patent
Kim et al.

(10) Patent No.: US 12,014,837 B2
(45) Date of Patent: Jun. 18, 2024

(54) METHOD FOR INTEGRATED ONLINE MONITORING AND SYSTEM FOR INTEGRATED ONLINE MONITORING FROM REMOTE LOCATION FOR NUCLEAR POWERPLANT

(71) Applicant: KOREA HYDRO & NUCLEAR POWER CO., LTD, Gyeongsangbuk-do (KR)

(72) Inventors: Dae Woong Kim, Sejong (KR); Yang Seok Kim, Daejeon (KR); Bum Nyun Kim, Gyeongsangbuk-do (KR); Young Sheop Park, Sejong (KR); Chi Yong Park, Daejeon (KR); Jong Seog Kim, Daejeon (KR); Hyoung Kyun Kim, Daejeon (KR); Byoung Oh Lee, Daejeon (KR); Ji In Kim, Seoul (KR); Nam Woo Choi, Gyeonggi-do (KR); Jae Hun Shin, Gyeongsangbuk-do (KR); Jae Min An, Gyeongsangbuk-do (KR); Yong Chan Kim, Gyeongsangbuk-do (KR)

(73) Assignee: KOREA HYDRO & NUCLEAR POWER CO., LTD., Gyeongsangbuk-do (KR)

( * ) Notice: Subject to any disclaimer, the term of this patent is extended or adjusted under 35 U.S.C. 154(b) by 844 days.

(21) Appl. No.: 16/328,588

(22) PCT Filed: Aug. 29, 2017

(86) PCT No.: PCT/KR2017/009424
§ 371 (c)(1),
(2) Date: Aug. 27, 2021

(87) PCT Pub. No.: WO2018/044036
PCT Pub. Date: Mar. 8, 2018

(65) Prior Publication Data
US 2022/0028570 A1 Jan. 27, 2022

(30) Foreign Application Priority Data

Aug. 29, 2016 (KR) .......................... 10-2016-0110306

(51) Int. Cl.
*G21D 3/00* (2006.01)
*G06Q 50/26* (2024.01)
*G08B 31/00* (2006.01)
*G21C 17/00* (2006.01)

(52) U.S. Cl.
CPC ............. *G21D 3/001* (2013.01); *G06Q 50/26* (2013.01); *G08B 31/00* (2013.01); *G21C 17/00* (2013.01); *G21D 3/008* (2013.01)

(58) Field of Classification Search
CPC ........ G21D 3/001; G21D 3/008; G06Q 50/26; G08B 31/00; G21C 17/00; Y02E 30/00; Y02E 30/30

(Continued)

(56) References Cited

U.S. PATENT DOCUMENTS 10,116,569 B1 * 10/2018 Panchanathan ....... H04L 41/147
2017/0269580 A1 * 9/2017 Hirahatake ........ G05B 23/0229
2019/0214156 A1 * 7/2019 Kim ....................... G21D 3/008

FOREIGN PATENT DOCUMENTS

EP 3306620 B1 * 6/2019 ............. G05B 23/02
JP S60151599 A 8/1985

(Continued)

OTHER PUBLICATIONS

English translation of JP 3633180, Mar. 2005. (Year: 2005).*
(Continued)

*Primary Examiner* — Michael P Nghiem
(74) *Attorney, Agent, or Firm* — Occhiuti & Rohlicek LLP (57) ABSTRACT

The present invention provides a method for integrated online monitoring and a system for integrated online moni-
(Continued)

toring from a remote location for a nuclear power plant. The method includes a first step of collecting machine monitoring data of a plurality of units in the nuclear power plant selectively from the local data acquisition device via the monitoring data relay device, and a second step of collecting machine diagnostic data of a plurality of units in the nuclear power plant selectively from the local data acquisition device via the diagnostic data relay device.

20 Claims, 4 Drawing Sheets

(58) Field of Classification Search
USPC .......................................................... 702/184
See application file for complete search history.

(56) References Cited

FOREIGN PATENT DOCUMENTS

| JP | 2000056080 | | 2/2000 |
|---|---|---|---|
| JP | 2003114294 | A | 4/2003 |
| JP | 3633180 | B2 * | 3/2005 |
| JP | 2011021977 | | 2/2011 |
| KR | 20150044448 | | 4/2015 |
| KR | 20150071069 | | 6/2015 |
| KR | 101604306 | | 3/2016 |
| KR | 101845621 | B1 * | 4/2018 |
| WO | 2016063374 | A1 | 4/2016 |

OTHER PUBLICATIONS

English translation of KR 101845621, Apr. 2018. (Year: 2018).*
Kim et al., KR10-2016-0110310, "Method of Implementing a Large Integrated Screen for Integrated Monitoring of Multiple Units and System", Aug. 29, 2016. (Year: 2016).*
English translation of Kim et al., KR10-2016-0110310, Aug. 29, 2016. (Year: 2016).*
Wang Liang et al. "Web-based remote monitoring system for nuclear power plant", 4th IEEE International Conference on Information Science and Technology, IEEE, Apr. 26, 2014, pp. 196-199, XP032657182, DOI: 10.1109/ICIST.2014.6920364.

* cited by examiner

METHOD FOR INTEGRATED ONLINE MONITORING AND SYSTEM FOR INTEGRATED ONLINE MONITORING FROM REMOTE LOCATION FOR NUCLEAR POWERPLANT

CROSS-REFERENCE TO RELATED APPLICATIONS

This application is the U.S. National Stage of International Application No. PCT/KR2017/009424, filed on Aug. 29, 2017, which claims the priority filing date of Korean Application No. 10 2016 0110306, filed on Aug. 29, 2016.

TECHNICAL FIELD

The present invention relates to a method for monitoring a power plant and, more particularly, to a method for integrated monitoring operating conditions and machine states of multiple units of nuclear power plant from a remote location.

BACKGROUND ART

Conventionally, operating conditions and machine states of a power plant are integrally monitored and managed in real time in a Main Control Room (MCR) located inside of the power plant. When it is monitored in the MCR as such, there are problems as below.

Generally, in the MCR, it is equipped with various types of monitoring panels and manipulation switches that are available to monitor and manage operating conditions and machine states of the power plant. In addition, in the MCR, professional operators work shifts in 24 hours and monitor operating conditions of the power plant. However, there is a problem that all of monitoring systems and monitoring data are usable only within the space of the MCR and monitoring and management is unavailable outside of the MCR of the power plant.

In addition, one MCR exists in each unit of the power plant and managed independently, and accordingly, all types of operation information are shared only within the MCR of the unit. Accordingly, it is unavailable to know the operating conditions of the power plant outside of the power plant and the operation conditions could not be shared with other power plant with each other in real time. Particularly, it is hard to share the power plant spot with the executives from the headquarter when a problem occurs in the power plant, and there is a restriction in communication with the power plant for determination of the executives since there is no data to analyze and determine in the headquarter.

Figure 1:
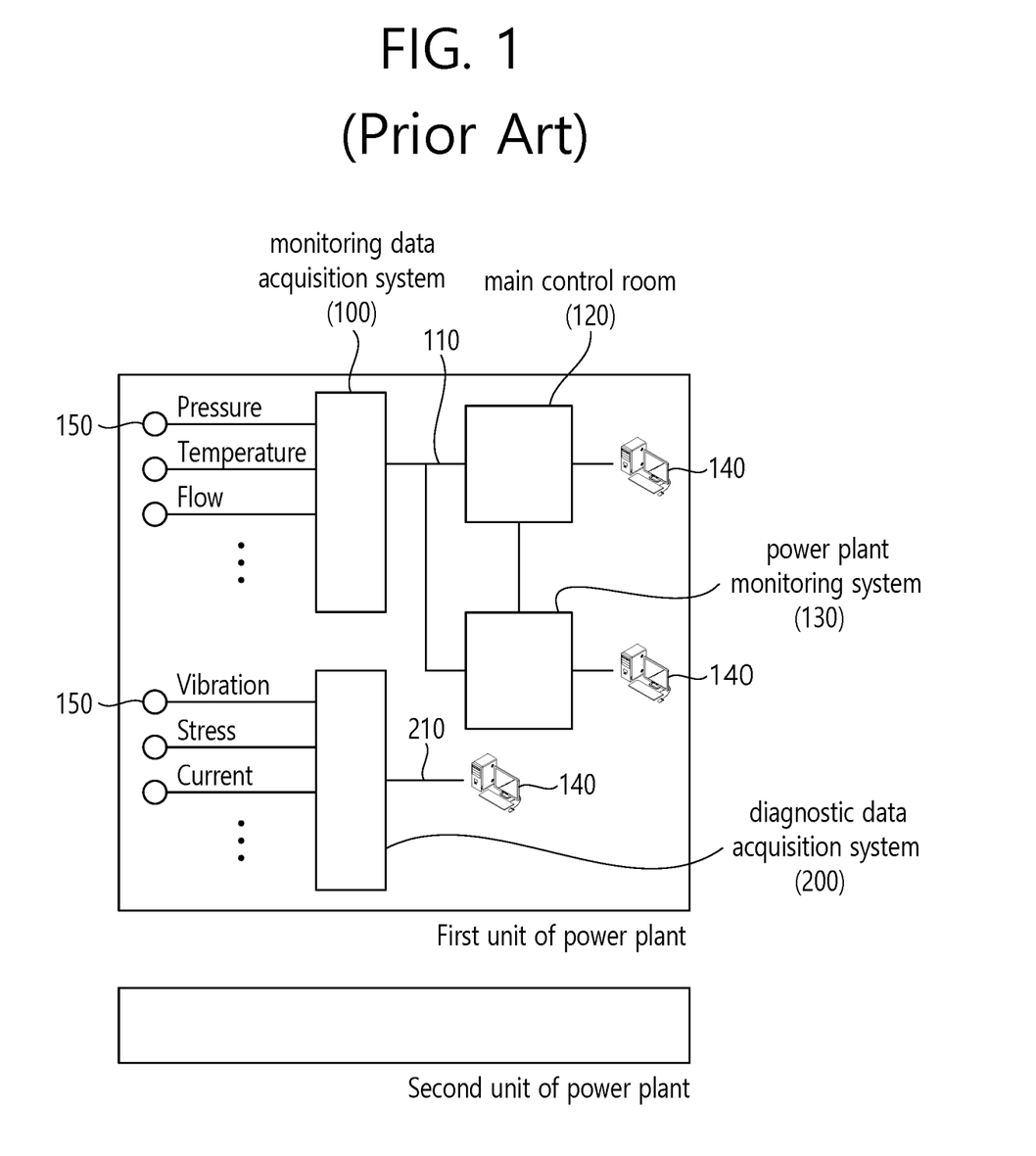
FIG. 1 is a diagram illustrating the conventional monitoring and diagnostic system within a nuclear power plant.

FIG. 1 is a diagram illustrating the conventional monitoring and diagnostic system within a nuclear power plant. Referring to FIG. 1, the monitoring data (e.g., temperature, pressure, vibration, etc.) or diagnostic data (e.g., vibration, stress, current, etc.) obtained in a power plant measuring instrument is collected firstly via input terminal 150 by a monitoring data acquisition system 100 or a diagnostic data acquisition system 200. The collected monitoring data or diagnostic data is transmitted to a main control room 120, a power plant monitoring system 130 and an operator computer 140 through designated network 110 and 210, and stored and analyzed.

Such a conventional monitoring system is connected to an independent network of the corresponding power plant only and it is hard to realize the operation condition of the power plant outside of the power plant. In addition, there is no method for exchanging data between power plants with each other, and it is impossible to manage power plants integrally.

BRIEF SUMMARY OF THE INVENTION

Technical Problem

An object of the present invention is to provide a method for integrated online monitoring and a system for integrated online monitoring nuclear power plant for monitoring online real time power plant operating conditions and operating states of machines from an integrated monitoring center which is a remote location from the nuclear power plant.

Technical Solution

According to an aspect of the present invention, the present invention provides a method for integrated online monitoring for a nuclear power plant from a remote location using an integrated online monitoring system including a monitoring data relay device, a diagnostic data relay device and a local data acquisition device. The method for integrated online monitoring for a nuclear power plant includes a first step of collecting machine monitoring data of a plurality of units in the nuclear power plant selectively from the local data acquisition device via the monitoring data relay device and a second step of collecting machine diagnostic data of a plurality of units in the nuclear power plant selectively from the local data acquisition device via the monitoring data relay device.

The first step may include transmitting the machine monitoring data to the monitoring data relay device from a power plant monitoring system via a unidirectional communication cable, the unidirectional communication cable has a cable output to exterior, but a cable input to the nuclear power plant therein is manufactured as an empty space; and synchronizing a file format and a communication scheme of the machine monitoring data received in the monitoring data relay device and transmitting the machine monitoring data to the local data acquisition device.

The second step may include transmitting the machine diagnostic data to the monitoring data relay device from a diagnostic data acquisition system and transmitting the machine diagnostic data received from the diagnostic data relay device to the local data acquisition device via an embedded unidirectional communication cable by transforming the machine diagnostic data into digital data, the unidirectional communication cable has a cable output to exterior, but a cable input to the power plant therein is manufactured as an empty space.

The local data acquisition device collects only monitoring data and diagnostic data registered as a monitoring target in advance from the monitoring data relay device and the diagnostic data relay device, and the method may further include a third step of transmitting the collected monitoring data and diagnostic data to a center integrated data processing device of the remote location.

The method for integrated online monitoring for a nuclear power plant may further include a fourth step of categorizing the machine monitoring data and the machine diagnostic data received from the center integrated data processing device and transmitting the monitoring data and the diagnostic data to at least one of a state monitoring integrated server, an early warning server and a machine diagnosing server.

The state monitoring integrated server may monitor a state of a plurality of units of the nuclear power plant, and interlink monitoring data required to implement a phase screen of systems and machines.

The early warning server may compute an anticipation value for early warning and generate data and screen for early warning by using the transmitted real time data.

The machine diagnosing server may diagnose a performance and a state by utilizing the transmitted diagnostic data.

The method for integrated online monitoring for a nuclear power plant may further include a fifth step of displaying the data processed in the state monitoring integrated server, the early warning server and the machine diagnosing server on at least one of an operator computer screen and a large integrated monitoring screen.

The method for integrated online monitoring for a nuclear power plant may further include a sixth step of storing the machine monitoring data and the machine diagnostic data processed in the center integrated data processing device, the state monitoring integrated server, the early warning server and the machine diagnosing server in a storage server for backup via a separate network, and calling and using the machine monitoring data and the machine diagnostic data when analyzing.

According to another aspect of the present invention, the present invention provides an integrated online monitoring system of a nuclear power plant in a remote location. The integrated online monitoring system of a nuclear power plant includes a monitoring data relay device for collecting machine monitoring data of a plurality of units in the nuclear power plant firstly, a diagnostic data relay device for collecting machine diagnostic data of a plurality of units in the nuclear power plant firstly, and a local data acquisition device for collecting the machine monitoring data and the machine diagnostic data selectively via the monitoring data relay device and the diagnostic data relay device.

The machine monitoring data is transmitted to the monitoring data relay device from a power plant monitoring system via a unidirectional communication cable, wherein the unidirectional communication cable has a cable output to exterior, but a cable input to the nuclear power plant therein is manufactured as an empty space, The monitoring data relay device may transmit the machine monitoring data to the local data acquisition device by synchronizing a file format and a communication scheme of the machine monitoring data received in the monitoring data relay device.

The machine diagnostic data may be transmitted to the monitoring data relay device from a diagnostic data acquisition system and the diagnostic data relay device may transmit the machine diagnostic data received from the diagnostic data relay device to the local data acquisition device via an embedded unidirectional communication cable by transforming the machine diagnostic data into digital data, and the unidirectional communication cable has a cable output to exterior, but a cable input to the power plant therein is manufactured as an empty space.

The integrated online monitoring system of a nuclear power plant may further include a center integrated data processing device of the remote location for receiving only the monitoring data and the diagnostic data registered as a monitoring target in advance in the local data acquisition device.

The integrated online monitoring system of a nuclear power plant may further include at least one of a state monitoring integrated server, an early warning server and a machine diagnosing server for receiving the machine monitoring data and the machine diagnostic data sorted by the center integrated data processing device.

The state monitoring integrated server may monitor a state of a plurality of units of the nuclear power plant, and interlink monitoring data required to implement a phase screen of systems and machines.

The early warning server may compute an anticipation value for early warning and generate data and screen for early warning by using the transmitted real time data.

The machine diagnosing server may diagnose a performance and a state by utilizing the transmitted diagnostic data.

The integrated online monitoring system of a nuclear power plant may further include at least one of an operator computer screen and a large integrated monitoring screen for displaying the data processed in the state monitoring integrated server, the early warning server and the machine diagnosing server.

The integrated online monitoring system of a nuclear power plant may further include a storage server for backup for storing the machine monitoring data and the machine diagnostic data processed in the center integrated data processing device, the state monitoring integrated server, the early warning server and the machine diagnosing server via a separate network, and calling and using the machine monitoring data and the machine diagnostic data when analyzing.

Advantageous Effects

As an increase of operating units of a nuclear power plant, there increases needs for constructing an integrated monitoring center that performs the function of integrally managing operating conditions of the entire power plant in addition to an independent operation of each power plant.

Example embodiment of the present invention proposes an efficient method and system configuration for transmitting large amount of data from the existing monitoring and diagnostic system installed in a plurality of power plants to an externally remote location of the power plant in real time.

For transmitting large amount of data, a communication security method is proposed for preventing invasion of the conventional system or for function protection of the conventional system, and a system configuration is proposed for collecting data integrally and transmit the data selectively in a power plant. Accordingly, in a remote integrated center, a system configuration is proposed for efficient state monitoring, early warning, machine diagnosis, and the like, and integrated management system configuration is proposed using a large integrated monitoring screen.

By using the method and system proposed in example embodiment of the present invention, a system construction is available for integrated managing operation and machine states of a nuclear power plant efficiently from remote location, and using above system construction, the executives from the headquarter may realize the operation condition of the power plant. And, the detection of unusual moments in advance through early warning and the machine failure cause analysis through the online diagnosis may contribute to perform an integrated management of a nuclear power plant and to minimize unusual stop (or shut down) of the power plant.

DETAILED DESCRIPTION OF THE INVENTION

The present invention may have various modifications and various embodiments and specific embodiments will be illustrated in the drawings and described in detail in the detailed description. However, this does not limit the present invention to specific embodiments, and it should be understood that the present invention covers all the modifications, equivalents and replacements included within the idea and technical scope of the present invention.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

When it is described that a component is "connected to" or "accesses" another component, the component may be directly connected to or access the other component or a third component may be present there between. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present invention will be described in detail with reference to the accompanying drawings and in describing the preferred embodiments with reference to the accompanying drawings, the same reference numeral will refer to the same or corresponding component regardless of the reference numeral and a duplicated description thereof will be omitted.

Example embodiment of the present invention proposes a method and system for integrated monitoring operating conditions and machine states of multiple units a power plant from remote location. The method and system enable to transmit signals of various types of measuring instruments installed in machines (e.g., turbine, pump, etc.) of a power plant for each of nuclear power plants located different locations to a centralized integrated monitoring center located a remote location outside of the power plant through a communication network. In addition, the method and system enable to store and process the signal collected in the integrated monitoring center and to integrated monitor operation conditions and machine states in the remote location. Hereinafter, the contents of example embodiment of the present invention are described in detail using embodiments and drawings.

Figure 2:
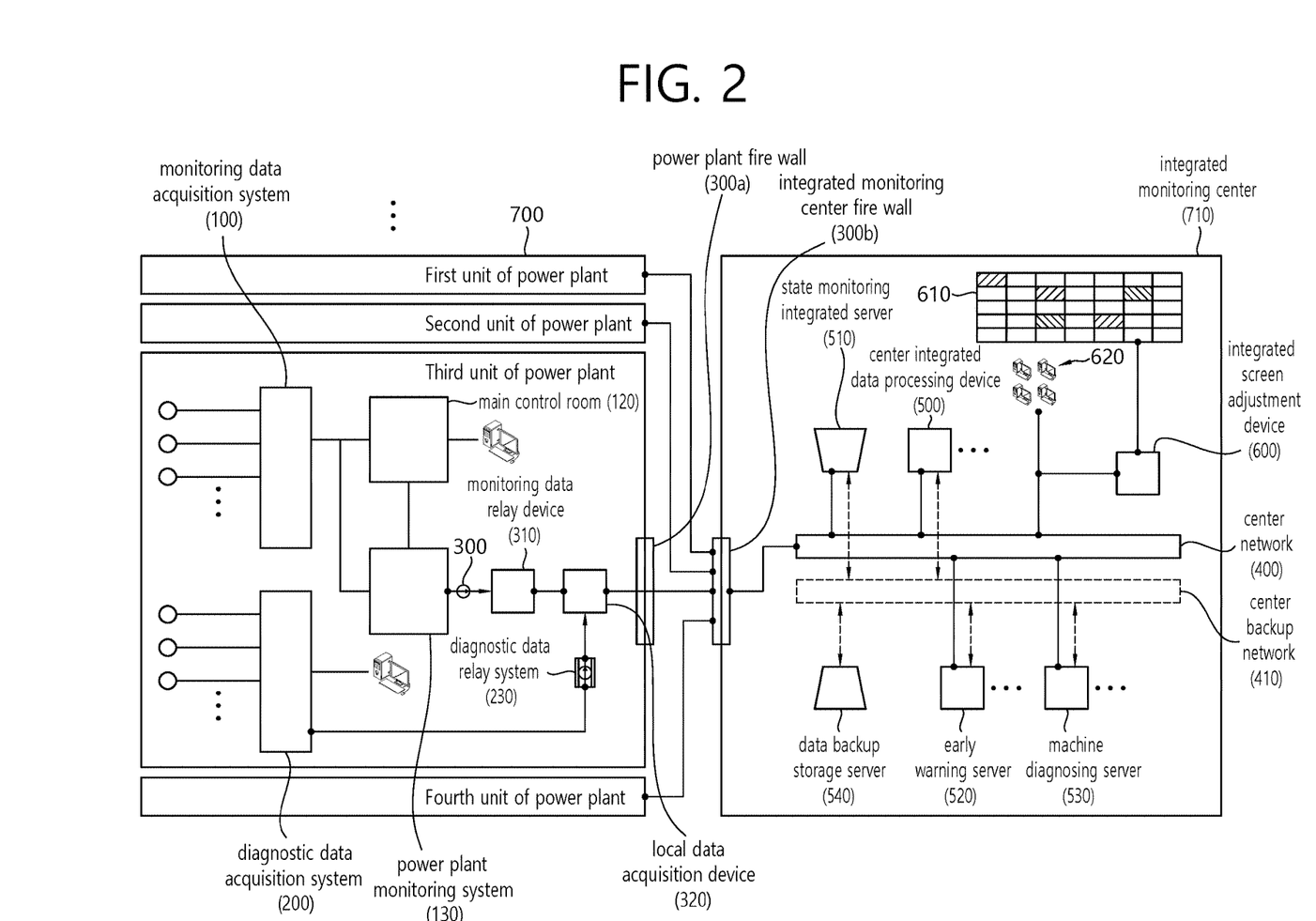
FIG. 2 is a configuration diagram of an online integrated monitoring system according to an embodiment of the present invention.

FIG. 2 is a configuration diagram of an online integrated monitoring system according to an embodiment of the present invention. As shown in FIG. 2, in the online integrated monitoring system of example embodiment of the present invention, a system is added to the conventional system, which is designed to transmit monitoring data and diagnostic data to a remote location outside of a power plant and to manage the data transmitted from a plurality of power plants/units integrally.

Referring to FIG. 2, the machine monitoring data collected firstly by the monitoring data acquisition system 100 is transmitted to a local data acquisition device 320 via a monitoring data relay device 310 from the power plant monitoring system 130. At this time, a unidirectional communication cable 300 that enables physical unidirectional communication is installed between the power plant monitoring system 130 and the monitoring data relay device 310. The unidirectional communication cable 300 has a cable output to exterior from the conventional communication cable, but a cable input to the power plant therein is manufactured as an empty space, and accordingly, input communication cannot be performed physically. Accordingly, the unidirectional communication cable 300 may protect the power plant system from exterior invasion.

The machine diagnostic data collected firstly from the diagnostic data acquisition system 200 is transmitted to the local data acquisition device 320 via a diagnostic data relay device 230 from the diagnostic data acquisition system 200. The diagnostic target device to obtain the diagnostic data is mainly targeted to dynamic machines (e.g., rotating machines such as pump, turbine, generator, etc. and valve types such as motor driving valve, air driving valve, etc.) persistently or frequently operating.

The diagnostic data relay device 230 is configured to receive data with a predetermined time interval (e.g., interval of 1 second) from the diagnostic data acquisition system 200 while diagnostic target devices are driving or operating usually. When unusual state, malfunction, problem and the like of a machine occur, it is configured to transmit raw data for a predetermined time interval (i.e., a time interval designated by an operator, commonly 2 to 5 minutes) automatically in a millisecond (msec) unit before and after the corresponding event occurs.

The unidirectional communication cable 300 is also embedded in the diagnostic data relay device 230 for security.

The diagnostic data includes real time measurement data that enable to analyze the physical property mainly. For example, for the pump, the real time measurement data may correspond to a current and a voltage of a motor, vibration/stress of axial direction, vibration/stress of radial direction, bearing vibration, various types of displacements, and the like, and for the valve, the real time measurement data may correspond to a current, a voltage, a displacement, torque stress, thrust stress, air pressure, and the like.

The monitoring data and the diagnostic data collected in the local data acquisition device 320 are transmitted to a center network 400 of an integrated monitoring center 710 via a power plant fire wall 300*a* and an integrated monitoring center fire wall 300*b* of a remote location.

The integrated monitoring center 710 is separately constructed by the center network 400 utilized for collecting and transmitting all data in the center and a center backup network 410 for storing data and calling and using the data whenever it is required, and accordingly, stable and efficient network operation may be available.

The monitoring data and the diagnostic data collected from the power plant pass through real time storing, categorizing and processing procedure in a center integrated data processing device 500. And then, the center integrated data processing device 500 transmits real time data and past data (i.e., data which is sorted/stored, not transmitted previously) to a state monitoring integrated server 510, an early warning server 520 and a machine diagnosing server 530 so as to be processed in each server.

An operator computer 620 is a computer used by a center operator, and the operator may check state monitoring data, early warning data and machine diagnosing data through the operator computer 620. In addition, the operator computer 620 may be interlinked with an integrated screen adjustment device 600, and implement the analyzed data in visible shapes and various process screens on a large integrated monitoring screen 610.

All of the data processed in the center integrated data processing device 500, the state monitoring integrated server 510, the early warning server 520 and the machine diagnosing server 530 are stored in a data backup storage server 540 via the center backup network 410. The servers are connected via a network so as to exchange data with each other.

Figure 3:
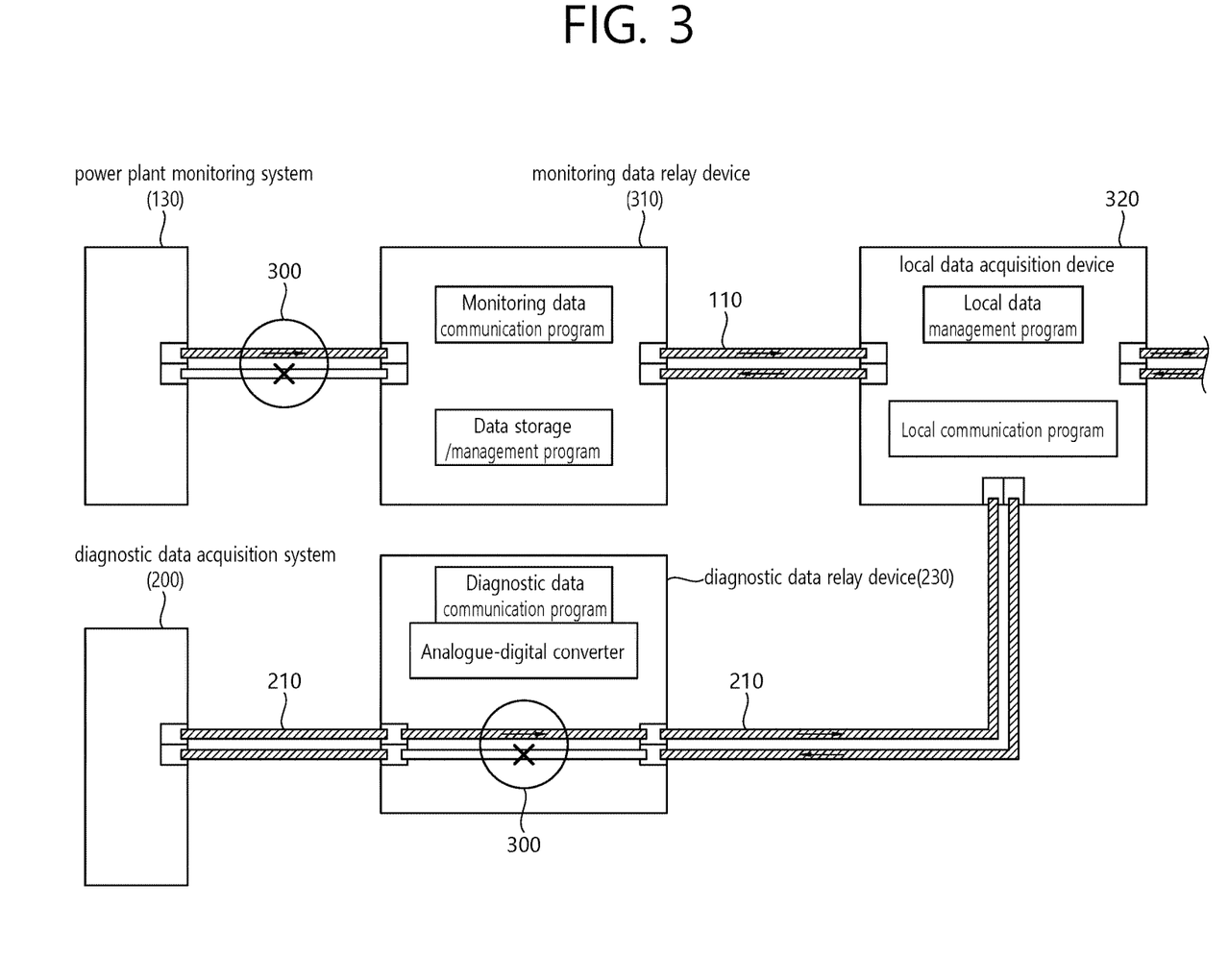
FIG. 3 is a configuration diagram of a data acquisition and transmitting device in a power plant according to an embodiment of the present invention.

FIG. 3 is a configuration diagram of a data acquisition and transmitting device in a power plant according to an embodiment of the present invention. Referring to FIG. 3, the unidirectional communication cable 300 used for connecting the power plant monitoring system 130 and the monitoring data relay device 310 includes a cable output to exterior, but a cable input to the power plant therein is manufactured as an empty space, and accordingly, input communication cannot be performed physically. Accordingly, monitoring data may be transmitted outside of the power plant via the local data acquisition device 320, but an access to the power plant monitoring system 130 from exterior of the power plant is fundamentally blocked and the communication security of the power plant may be implemented.

The monitoring data relay device 310 is a device that has functions of receiving monitoring data from the power plant monitoring system 130, storing and processing the monitoring data, and then, transmitting it to the local data acquisition device 320.

In the monitoring data relay device 310, a monitoring data communication program and a data storage/management program are installed.

The monitoring data communication program includes functions of synchronizing communication schemes (e.g., file format, communication scheme, etc.) between hetero systems and forwarding data to other system. The monitoring data communication program may also process data even in the case that input data is text file format or memory sharing data format, for example.

The data storage/management program has the function of storing and monitoring the monitoring data which is transmitted.

The diagnostic data relay device 230 is a device that has functions of receiving diagnostic data from the diagnostic data acquisition system 200 and storing and processing the diagnostic data, and then, transmitting it to the local data acquisition device 320.

The diagnostic data relay device 230 includes an analogue-digital converter, and a diagnostic data communication program is installed therein.

The diagnostic data communication program includes functions of converting analogue data (e.g., vibration, current, etc.) received through the analogue-digital converter to digital data, and transmitting the digital data to the local data acquisition device 320.

The diagnostic data communication program includes functions of converting analogue data to digital data of a predetermined time interval (e.g., 1 second, 1 millisecond, etc.) and storing it usually, and transmitting it to the local data acquisition device 320 simultaneously. If a failure or an unusual condition occurs in a machine, the diagnostic data communication program includes functions of converting analogue data of a predetermined time interval of before and after the occurrence time to raw digital data automatically and storing it, and transmitting it to the local data acquisition device 320.

The unidirectional communication cable 300 is embedded in the diagnostic data relay device 230, and diagnostic data may be transmitted to outside of the power plant through the local data acquisition device 320, but an access to the diagnostic data acquisition system 200 from exterior of the power plant is fundamentally blocked and the communication security of the power plant may be implemented.

The local data acquisition device 320 integrally manages all of the monitoring data and the diagnostic data collected in the power plant in the power plant finally, and transmits the data to the integrated monitoring center of a remote location located outside of the power plant.

A local data management program and a local communication program are installed in the local data acquisition device 320.

The local data management program includes the functions of registering monitoring data and diagnostic data (i.e., monitoring and diagnostic target data) that are required to be collected in advance, and collecting selected data. In addition, local data management program includes the function of storing, categorizing and processing the collected monitoring data and diagnostic data.

The local communication program includes the function of transmitting the data selected from the monitoring data relay device 310 and the diagnostic data relay device 230 to the local data acquisition device 320. In addition, the local communication program includes the function of adjusting transmission time zone (e.g., automatically transmitted on 12:15 pm) of data, transmission time interval (e.g., transmitted on every 1 or 5 seconds), types of transmission data (e.g., monitoring data, diagnostic data, data registered as a monitoring target, etc.), and the like through mutual communication with the center integrated data processing device 500 of the integrated monitoring center 710. Furthermore, the monitoring data and the diagnostic data that are not registered in the local data acquisition device 320 as a target of monitoring and diagnosing are stored in the monitoring data relay device 310 and the diagnostic data relay device 230 for a predetermined period, and the local communication program includes the function of collecting and transmitting data additionally registered in the case that the monitoring and diagnostic target required for the local data management program of the local data acquisition device 320 are additionally registered through a remote access from the integrated monitoring center 710 if it is required.

By the two functions (i.e., functions of transmitting only the registered monitoring and diagnostic target data and transmitting the additionally registered monitoring and diagnostic data if it is required), only the data which is required is transmitted to exterior of the power plant, and accordingly, communication load between a plurality of power plants and the integrated monitoring center 710 may be minimized, and transmission speed of data may be managed efficiently.

Figure 4:
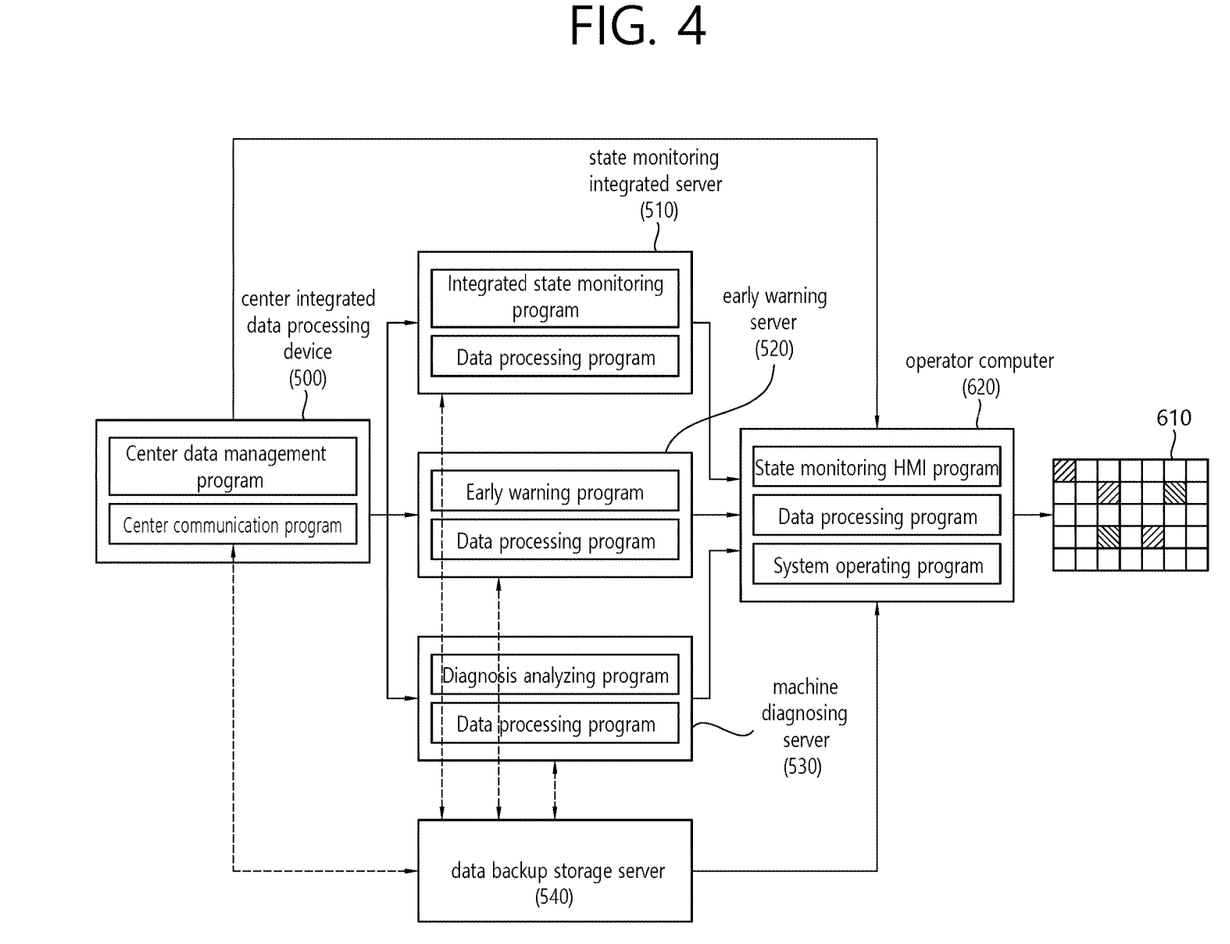
FIG. 4 is a diagram of integrated monitoring center configuration and data flow according to an embodiment of the present invention.

FIG. 4 is a diagram of integrated monitoring center configuration and data flow according to an embodiment of the present invention. Referring to FIG. 4, the integrated monitoring center 710 includes the center integrated data processing device 500, the state monitoring integrated server 510, the early warning server 520, the machine diagnosing server 530 and the operator computer 620.

The servers may be configured with different devices with each other or may be commonly configured in at least one device among the servers. In addition, the system in the integrated monitoring center 710 may further include the large integrated monitoring screen 610.

All of the data transmitted from the power plant 700 to the integrated monitoring center 710 is processed firstly in the center integrated data processing device 500. Later, the data requested by each of the servers is transmitted to the state monitoring integrated server 510, the early warning server 520 and the machine diagnosing server 530.

Each of the servers processes data by utilizing separate computing and analyzing program installed in the servers, and then, transmits the processed data to the operator computer 620.

The operator may monitor power plant machines through a computer dedicated screen or the large integrated monitoring screen 610.

When the integrated monitoring center 710 system is designed as above, large amount of data of nearly a dozen of a plurality of power plants may be efficiently processed in real time. That is, the dedicated servers that take charge of each function of trying to implement in the integrated monitoring center 710 are separately constructed, and accordingly, an accurate computation and analysis in second unit or millisecond unit of the large amount of data may be performed in each server. In addition, only the processed result and screen are transmitted to the operator computer 620, and real time online integrated monitoring and diagnosing functions in second unit or millisecond unit may be implemented.

The detailed functions of the elements of the integrated monitoring center 710 system are as below.

The center integrated data processing device 500 collects the data transmitted from the local data acquisition device 320 installed in a remote location power plant in the integrated monitoring center 710 initially. Then, the center integrated data processing device 500 performs functions of managing, categorizing/distributing the collected data.

A center data management program and a center communication program are installed in the center integrated data processing device 500.

The center data management program is a program that stores and manages the data transmitted from the local data acquisition device 320. In addition, the center data management program is a program that processes categorizing, transmission period, and the like for each function of the data to be transmitted to the state monitoring integrated server 510, the early warning server 520 and the machine diagnosing server 530.

The center communication program includes the function of transmitting the data required in the servers (i.e., the state monitoring integrated server 510, the early warning server 520 and the machine diagnosing server 530) connected for each channel in accordance with conditions.

When power plant units are increased and data transmitted from the power plant is increased, it may be operated by increasing the number of center integrated data processing devices 500.

The state monitoring integrated server 510 is a server that monitors the state of systems/machines by receiving data of monitoring the state of the systems/machines of the power plant.

An integrated state monitoring program and a data processing program are installed in the state monitoring integrated server 510.

The integrated state monitoring program includes the function of monitoring state monitoring variable (e.g., temperature, pressure, rate of flow, etc.) data of machines in real time and monitoring whether the values are changed, differences are occurred, tendency is changing, and the like. In addition, in order to efficiently perform the state monitoring visually, the integrated state monitoring program is programmed so as to display the state monitoring data in drawings (i.e., phase screen) that shape the power plant systems and forms of the machines.

The data processing program includes the function of designating and displaying data such that the received data is accurately displayed in each system/machine of the phase screen, and may further include the function of changing the color of the data if it is required.

The state monitoring integrated server 510 manages the monitoring data of all power plants 700 integrally in a single server and interlinks the monitoring data required for monitoring states of all power plants and implementing the phase screen of system/machines through accessing the server. Since the state monitoring and the phase screen implementation that use the monitoring data transmitted from the power plant without any change of applying separate complex operation or analyzing program have relatively not so great data amount, and accordingly, all power plants data may be managed integrally in a single integrated server as such.

The early warning server 520 is installed with a data processing program and an early warning program that computes an anticipation value for early warning by processing the transmitted data in real time, and generates data and screen for early warning.

The early warning program includes the functions of discovering unusual symptom of system/machine by utilizing the transmitted data and generating a warning. More particularly, the early warning program generates an anticipation value by utilizing real time transmission data (i.e., current value) and generates a warning by using differences of two values comparing the current value and the anticipation value.

The data processing program includes the function of processing the transmitted data in the data format required in the early warning in order to input the data in the early warning program.

The machine diagnosing server 530 is a server in which the data processing program and a diagnosis analyzing program for diagnosing the performance and state of machines by processing the transmitted diagnostic data.

The diagnosis analyzing program includes the function of inputting the input data in a preconfigured in a program diagnostic model and diagnostic modeling, and determining a state of machine by recalculating it in a diagnostic algorithm. For example, the diagnosis analyzing program may diagnose that a shaft of machine is bent or of which abrasion is serious. A part of the monitoring data (temperature, pressure, etc.) described above is used for the diagnostic data, but utilized by reproducing the diagnostic data (vibration, stress, etc.) by the data processing program mainly.

The operator computer 620 includes the function of implementing the data and screens processed in each dedicated server on each operator computer dedicated screen or the large integrated monitoring screen 610. In addition, a separate analyzing application and the like is installed in the operator computer 620, and an operator may perform a task processed in the state monitoring integrated server 510, the early warning server 520 and the machine diagnosing server 530 if it is required.

A state monitoring Human-Machine Interface (HMI) program, a data processing program and a system operating program are installed in the operator computer 620.

The state monitoring HMI program includes the function of operating monitoring/diagnosing/early warning program such as displaying a phase screen of system/machine and changing a screen for each power plant unit.

The data processing program includes the function of processing data of the system operating program and the state monitoring HMI program.

The system operating program includes the function of operating a complex bulletin with being interlinked with the large integrated monitoring screen 610.

The large integrated monitoring screen 610 implements the monitoring and diagnosis result processed in each server in various screens, and enables the driving states of all power plants and the machine operation sates to be monitored integrally in real time. In addition, abnormal state display and early warning screen, and the like are implemented in the large integrated monitoring screen 610 when an abnormal state occurs, and the power plant driving state may be managed in real time even in a remote location.

The data backup storage server 540 is a server that functions to backup monitoring/diagnostic/early warning data, and configured so as to exchange the data with each other by being connected with each data processing device and servers via the center backup network 410. In addition, the data backup storage server 540 may transmit the backup data to the operator computer 620 when the backup data is requested by the operator computer 620 for analyzing and the like.

So far, various embodiments of the present invention are described. However, it is understood that the description is just for illustration and not to limit the scope of the present invention defined by the scope of the following claims. Accordingly, other embodiments are also within the scope of the following claims. For example, various modifications may be performed without departing from the scope of the present invention. Additionally, a part of the steps described above are independent from the order, and may be performed in different order from those of described above.

DESCRIPTION OF REFERENCE NUMERALS

100: monitoring data acquisition system
110: monitoring data network
120: Main Control Room
130: power plant monitoring system
140: operator computer (Client PC): input terminal
200: diagnostic data acquisition system
210: diagnostic data network
210: diagnostic data network
230: diagnostic data relay device
300: unidirectional communication cable (external type)
310: monitoring data relay device
320: local data acquisition device
330a, 330b: fire wall
400: center network
410: center backup network
500: center integrated data processing device
510: state monitoring integrated server
520: early warning server
530: machine diagnosing server
540: data backup storage server
600: integrated screen adjustment device
610: large integrated monitoring screen
620: operator computer
700: nuclear power plant
710: integrated monitoring center

The invention claimed is:

1. A method for integrated online monitoring for a nuclear power plant from a remote location using an online integrated monitoring system including a monitoring data relay device, a diagnostic data relay device, and a local data acquisition device, the method comprising:
a first step of collecting machine monitoring data of a plurality of units in the nuclear power plant selectively by the local data acquisition device via the monitoring data relay device and
a second step of collecting machine diagnostic data of a plurality of units in the nuclear power plant selectively by the local data acquisition device via the diagnostic data relay device,
wherein the first step includes:
transmitting the machine monitoring data to the monitoring data relay device from a power plant monitoring system via a unidirectional communication cable, wherein the unidirectional communication cable, which enables physical unidirectional communication, is installed between the power plant monitoring system and the monitoring data relay device, and
wherein the second step includes:
transmitting, by the diagnostic data relay device, the machine diagnostic data to the local data acquisition device via an embedded unidirectional communication cable by transforming the machine diagnostic data into digital data, wherein the embedded unidirectional communication cable, which enables physical unidirectional communication, is in the diagnostic data relay device.

2. The method for integrated online monitoring for a nuclear power plant of claim 1, wherein the first step includes: synchronizing a file format and a communication scheme of the machine monitoring data received in the monitoring data relay device and transmitting the machine monitoring data to the local data acquisition device.

3. The method for integrated online monitoring for a nuclear power plant of claim 1, wherein the second step includes: transmitting, by diagnostic data acquisition system, the machine diagnostic data to the diagnostic data relay device.

4. The method for integrated online monitoring for a nuclear power plant of claim 1, wherein the local data acquisition device collects only monitoring data and diagnostic data registered as a monitoring target in advance from the monitoring data relay device and the diagnostic data relay device, and further comprising a third step of transmitting the collected monitoring data and diagnostic data to a center integrated data processing device of the remote location.

5. The method for integrated online monitoring for a nuclear power plant of claim 4, further comprising a fourth step of categorizing the machine monitoring data and the machine diagnostic data received from the center integrated data processing device and transmitting the monitoring data and the diagnostic data to at least one of a state monitoring integrated server, an early warning server and a machine diagnosing server.

6. The method for integrated online monitoring for a nuclear power plant of claim 5, wherein the state monitoring integrated server monitors a state of a plurality of units of the nuclear power plant and interlinks monitoring data required to implement a phase screen of systems and machines.

7. The method for integrated online monitoring for a nuclear power plant of claim 5, wherein the early warning server computes an anticipation value for early warning and generates data and screen for early warning by using transmitted real time data.

8. The method for integrated online monitoring for a nuclear power plant of claim 5, wherein the machine diagnosing server diagnoses a performance and a state by utilizing transmitted diagnostic data.

9. The method for integrated online monitoring for a nuclear power plant of claim 5, further comprising a fifth step of displaying the data processed in the state monitoring integrated server, the early warning server and the machine diagnosing server on at least one of an operator computer screen and a large integrated monitoring screen.

10. The method for integrated online monitoring for a nuclear power plant of claim 9, further comprising a sixth step of storing the machine monitoring data and the machine diagnostic data processed in the center integrated data processing device, the state monitoring integrated server, the early warning server and the machine diagnosing server as backup data in a storage server for backup via a separate network, and calling and using the backup data when the backup data is requested by the operator computer for analyzing.

11. An online integrated monitoring system of a nuclear power plant in a remote location, comprising:
a monitoring data relay device for collecting machine monitoring data of a plurality of units in the nuclear power plant firstly; a diagnostic data relay device for collecting machine diagnostic data of a plurality of units in the nuclear power plant firstly; and
a local data acquisition device for collecting the machine monitoring data and the machine diagnostic data selectively via the monitoring data relay device and the diagnostic data relay device,
wherein the machine monitoring data is transmitted to the monitoring data relay device from a power plant monitoring system via a unidirectional communication cable, wherein the unidirectional communication cable that enables physical unidirectional communication is installed between the power plant monitoring system and the monitoring data relay device, and
wherein the diagnostic data relay device transmits the machine diagnostic data to the local data acquisition device via an embedded unidirectional communication cable by transforming the machine diagnostic data into digital data, wherein the embedded unidirectional communication cable that enables physical unidirectional communication is in the diagnostic data relay device.

12. The integrated online monitoring system of a nuclear power plant of claim 11, wherein the monitoring data relay device transmits the machine monitoring data to the local data acquisition device by synchronizing a file format and a communication scheme of the machine monitoring data received in the monitoring data relay device.

13. The integrated online monitoring system of a nuclear power plant of claim 11, wherein the machine diagnostic data are transmitted to the diagnostic data relay device from a diagnostic data acquisition system.

14. The integrated online monitoring system of a nuclear power plant of claim 11, further comprising a center integrated data processing device of the remote location, the center integrated data processing device receiving only the monitoring data and the diagnostic data registered as a monitoring target in advance in the local data acquisition device.

15. The integrated online monitoring system of a nuclear power plant of claim 14, further comprising at least one of a state monitoring integrated server, an early warning server and a machine diagnosing server for receiving the machine monitoring data and the machine diagnostic data sorted by the center integrated data processing device.

16. The integrated online monitoring system of a nuclear power plant of claim 15, wherein the state monitoring integrated server monitors a state of a plurality of units of the nuclear power plant, and interlinks monitoring data required to implement a phase screen of systems and machines.

17. The integrated online monitoring system of a nuclear power plant of claim 15, wherein the early warning server computes an anticipation value for early warning and generates data and screen for early warning by using a transmitted real time data.

18. The integrated online monitoring system of a nuclear power plant of claim 15, wherein the machine diagnosing server diagnoses a performance and a state by utilizing transmitted diagnostic data.

19. The integrated online monitoring system of a nuclear power plant of claim 15, further comprising at least one of an operator computer screen and a large integrated monitoring screen for displaying the data processed in the state monitoring integrated server, the early warning server and the machine diagnosing server.

20. The integrated online monitoring system of a nuclear power plant of claim 19, further comprising a storage server for backup for storing the machine monitoring data and the machine diagnostic data processed in the center integrated data processing device, the state monitoring integrated server, the early warning server and the machine diagnosing server as backup data via a separate network, and calling and using the backup data when the backup data is requested by the operator computer for analyzing.

* * * * *